O. SERPEK.
PROCESS OF PRODUCING ALUMINIUM NITRID.
APPLICATION FILED APR. 14, 1915.
1,212,119.
Patented Jan. 9, 1917.
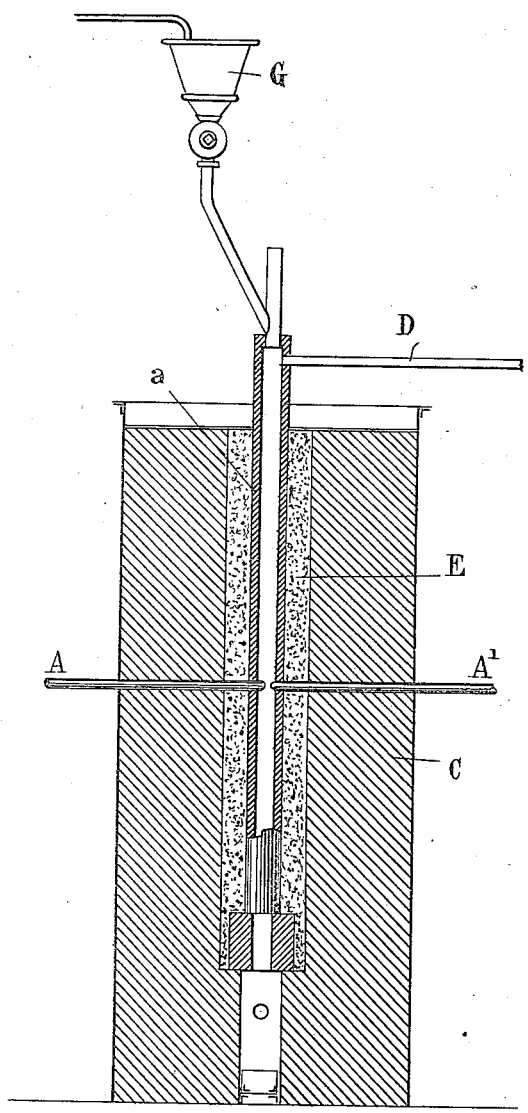
INVENTOR
Ottokar Serpek
by his attorneys
Howson and Howson

UNITED STATES PATENT OFFICE.

OTTOKAR SERPEK, OF PARIS, FRANCE, ASSIGNOR TO SOCIETE GÉNÉRALE DES NITRURES, OF PARIS, FRANCE.

PROCESS OF PRODUCING ALUMINIUM NITRID.

1,212,119. Specification of Letters Patent. Patented Jan. 9, 1917.

Original application filed October 23, 1913, Serial No. 796,913. Divided and this application filed April 14, 1915. Serial No. 21,322.

*To all whom it may concern:*

Be it known that I, OTTOKAR SERPEK, a subject of the Emperor of Austria-Hungary, and at present residing in Paris, France, have invented an Improved Process of Producing Aluminium Nitrid, of which the following is a specification.

The invention relates to a process of obtaining aluminium nitrid in which a mixture of carbon and aluminous material is heated in an atmosphere containing nitrogen, this case being a division of my application Ser. No. 796,913 filed Oct. 23, 1913.

According to the invention, the reacting mixture is projected, either by falling freely or under the influence of a gaseous stream, through one or more electric arcs in relatively narrow or restricted spaces which are free from any solid obstacle and without the materials being able to remain upon the walls of the furnace. For this reaction the temperature of the heated zone, the length of this zone, and the speed of passage of the mixture through the latter, are evidently functions one of another, in such a way that for example the higher the temperature of the zone and the greater its length, the higher must be its speed. This temperature may attain or exceed the temperatures of decomposition of the aluminium nitrid obtained or of the primary substance first employed, because, by suitably regulating the speed with which the reacting substances are made to pass through the heated zone, it is possible to effect the desired reaction in a rapid manner without entailing decomposition of the aluminium nitrid obtained.

In order to raise to the suitable temperature the zone where the reaction takes place, there may be employed a tube in which one or more arcs may be produced. In this case, in order to distribute the heat more uniformly, the arcs may be blown either magnetically or by means of a current of gas which might consist of nitrogen for example in the present case. The solid bodies brought to the most suitable state (powder, grains, agglomerates, etc.) may fall vertically through the heated zone, the current of gas being then passed either in the same or in the opposite direction; again these bodies may be projected upward by using a gaseous current sufficiently strong to carry them. In this case the apparatus in which the reaction takes place may also be horizontal or have any other direction.

In case the reaction were not completed after a single passage, the bodies intended to react might be passed successively through several apparatus or several times through the same apparatus. The same might be done with the gases.

As usual the heat contained in the gases leaving the apparatus may be utilized for preliminary heating of the materials to be treated and the heat contained in the solid materials leaving the furnace be used for heating the gases.

By way of example, I have indicated in a vertical sectional diagram an apparatus which may be used in carrying out my process, but I do not here claim this construction nor do I wish to confine myself thereto.

In this view, $a$ indicates a vertical tube several meters high. It is insulated externally as by walls of refractory and inert material C, E. Into this vertical tube will project one or more sets of electrodes A and $A^1$ to which conductors from a generator may be connected to produce the electric arc or arcs.

By means of a suitable feeding device at G there is introduced at the top of the tube a mixture of alumina or alumina-containing substances and carbon in suitable proportions, and the mixture is allowed to flow freely through the arcs, the particles being dispersed by falling downward by gravity in the presence of nitrogen introduced inside the tube $a$, as by a pipe at D. In this instance the current of gas will flow downward in the same direction as the powdered material. In this way there is provided aluminium nitrid and this is so even if the material attains a temperature of over 2300° C., which is that of the decomposition of the nitrid. The rapidity of reaction is the more remarkable because the reaction of the formation of nitrid is not a simple absorption of nitrogen. The formation of nitrid is the result of double reaction.

This process offers in comparison with all the processes at present employed for obtaining aluminium nitrid, among others the advantage of not involving rapid deterioration of the apparatus which at present renders some of these manufactures so costly.

I claim as my invention:

1. A process of obtaining aluminium nitrid, by heating aluminous material and carbon in an atmosphere containing nitrogen, the solid bodies being projected freely through a space filled with nitrogen and heated to the temperature of the reaction.

2. A process of obtaining aluminium nitrid, by heating aluminous material and carbon in an atmosphere of nitrogen, the solid bodies being projected in powdered form freely through a space filled with nitrogen and heated to the temperature of the reaction.

3. A process of obtaining aluminium nitrid, by heating aluminous material and carbon in an atmosphere of nitrogen, the solid bodies being allowed to fall freely through a space filled with nitrogen and heated to the temperature of the reaction.

4. A process of obtaining aluminium nitrid, by causing a mixture of aluminous material and carbon in finely divided condition to be projected freely through an electric arc in the presence of nitrogen.

5. A process of obtaining aluminium nitrid by causing a mixture of aluminous material and carbon in finely divided condition to be projected freely through an electric arc, together with a current of nitrogen flowing in the same direction.

6. A process of obtaining aluminum nitrid, which consists in rapidly passing carbon and aluminous material in finely divided condition through a zone heated to the reaction temperature in the presence of nitrogen, the particles being dispersed at the reaction zone to permit free access of the heat and nitrogen thereto.

In testimony whereof I have signed my name to this specification.

OTTOKAR SERPEK.